(12) United States Patent
Ertz et al.

(10) Patent No.: US 11,376,630 B2
(45) Date of Patent: Jul. 5, 2022

(54) ULTRASONIC VIBRATION UNIT WITH DAMPING

(71) Applicant: Herrmann Ultraschalltechnik GmbH & Co. KG, Karlsbad (DE)

(72) Inventors: Gabriel Ertz, Hannover (DE); Jens Twiefel, Hannover (DE); Jorg Wallaschek, Hannover (DE); Ulrich Vogler, Uhldingen-Muhlhofen (DE)

(73) Assignee: HERRMANN ULTRASCHALLTECHNIK GMBH & CO. KG, Karlsbad (DE)

( * ) Notice: Subject to any disclaimer, the term of this patent is extended or adjusted under 35 U.S.C. 154(b) by 170 days.

(21) Appl. No.: 16/765,228

(22) PCT Filed: Nov. 19, 2018

(86) PCT No.: PCT/EP2018/081686
§ 371 (c)(1),
(2) Date: May 19, 2020

(87) PCT Pub. No.: WO2019/101666
PCT Pub. Date: May 31, 2019

(65) Prior Publication Data
US 2020/0276613 A1 Sep. 3, 2020

(30) Foreign Application Priority Data
Nov. 24, 2017 (DE) ...................... 10 2017 127 826.5

(51) Int. Cl.
*B29C 65/00* (2006.01)
*B06B 3/02* (2006.01)

(52) U.S. Cl.
CPC .............. *B06B 3/02* (2013.01); *B29C 66/816* (2013.01); *B06B 2201/72* (2013.01)

(58) Field of Classification Search
CPC ..... B06B 3/02; B06B 2201/72; B29C 66/816; B29C 65/08
(Continued)

(56) References Cited

U.S. PATENT DOCUMENTS

| 2,866,911 A | 12/1958 | Rawding |
| 4,647,336 A | 3/1987 | Coenen |

(Continued)

FOREIGN PATENT DOCUMENTS

| CN | 85108660 A | 10/1985 |
| CN | 105026095 A | 11/2015 |

(Continued)

OTHER PUBLICATIONS

Nora Lindner, The International Bureau of the World Intellectual Property Organization, International Preliminary Report on Patentability, PCT/EP2018/081686, dated Jun. 4, 2020 (English translation).

(Continued)

*Primary Examiner* — James D Sells
(74) *Attorney, Agent, or Firm* — Paul & Paul (57) ABSTRACT

The present invention concerns an ultrasonic vibration unit having a converter (1) for converting an electric ac voltage into a mechanical ultrasonic vibration and a sonotrode which is vibrationally coupled to the converter (1), wherein the sonotrode and the converter (1) are matched to each other in such a way that the ultrasonic vibration unit can vibrate with a natural frequency f, in which a standing longitudinal wave having at least one vibration node and at least two vibration antinodes is formed within the ultrasonic vibration unit. To provide an ultrasonic vibration unit in which the parasitic vibrations which usually occur in operation with a working frequency are slight or do not occur, wherein at the same time the actual working frequency is not attenuated, it is (Continued)

proposed according to the invention that there is provided a damp vibration absorber unit (2) connected to the ultrasonic vibration unit by way of a coupling element (3), wherein the coupling element (3) is connected to the ultrasonic vibration unit at a vibration node, wherein the vibration absorber unit (2) is connected to a damping element (4) which is so adapted that it damps a vibration of the vibration absorber unit (2).

22 Claims, 7 Drawing Sheets

(58) Field of Classification Search
USPC .......................................... 156/580.1, 580.2
See application file for complete search history.

(56) References Cited

U.S. PATENT DOCUMENTS

| | | | |
|---|---|---|---|
| 4,691,724 A | 9/1987 | Garcia et al. | |
| 7,766,067 B2 * | 8/2010 | Voss | B06B 3/00 156/580.2 |
| 2007/0251978 A1 | 11/2007 | Konieczka | |
| 2009/0289528 A1 | 11/2009 | Voss | |
| 2010/0006235 A1 | 1/2010 | Patrikios et al. | |
| 2016/0023297 A1 | 1/2016 | Stroh et al. | |

FOREIGN PATENT DOCUMENTS

| | | |
|---|---|---|
| CN | 106140593 A | 11/2016 |
| DE | 8617264 U1 | 10/1986 |
| JP | 2001030087 A | 2/2001 |
| WO | 0153032 A1 | 7/2001 |

OTHER PUBLICATIONS

Shi Chen, China Patent Office, Office Action, Chinese Patent Application No. CN201880074263.3, dated Dec. 3, 2020 (and English Translation of Office Action).

* cited by examiner

ULTRASONIC VIBRATION UNIT WITH DAMPING

CROSS-REFERENCE TO RELATED APPLICATION

This application is a 371 national stage application of International Application PCT/EP2018/081686, filed Nov. 19, 2018, and claims the priority of German Application No. 10 2017 127 826.5, filed on Nov. 24, 2017.

The present invention concerns an ultrasonic vibration unit having at least one converter for converting an electric ac voltage into a mechanical ultrasonic vibration and a sonotrode which is vibrationally coupled to the converter. In that arrangement vibration coupling can be effected either by the converter being fixed directly to the sonotrode or by the interposition of an amplitude transformer.

Such an ultrasonic vibration unit can be used for welding the most widely varying materials. In that case the sonotrode is brought into contact with the material to be worked so that the sonotrode transmits an ultrasonic vibration to the material to be worked. In general for that purpose the material to be worked is positioned between the sonotrode and a counterpart tool so that the sonotrode applies a force to the material in the direction of the counterpart tool.

Frequently the components of the ultrasonic vibration unit: converter, amplitude transformer and sonotrode are arranged along a pronounced longitudinal axis.

Figure 7:
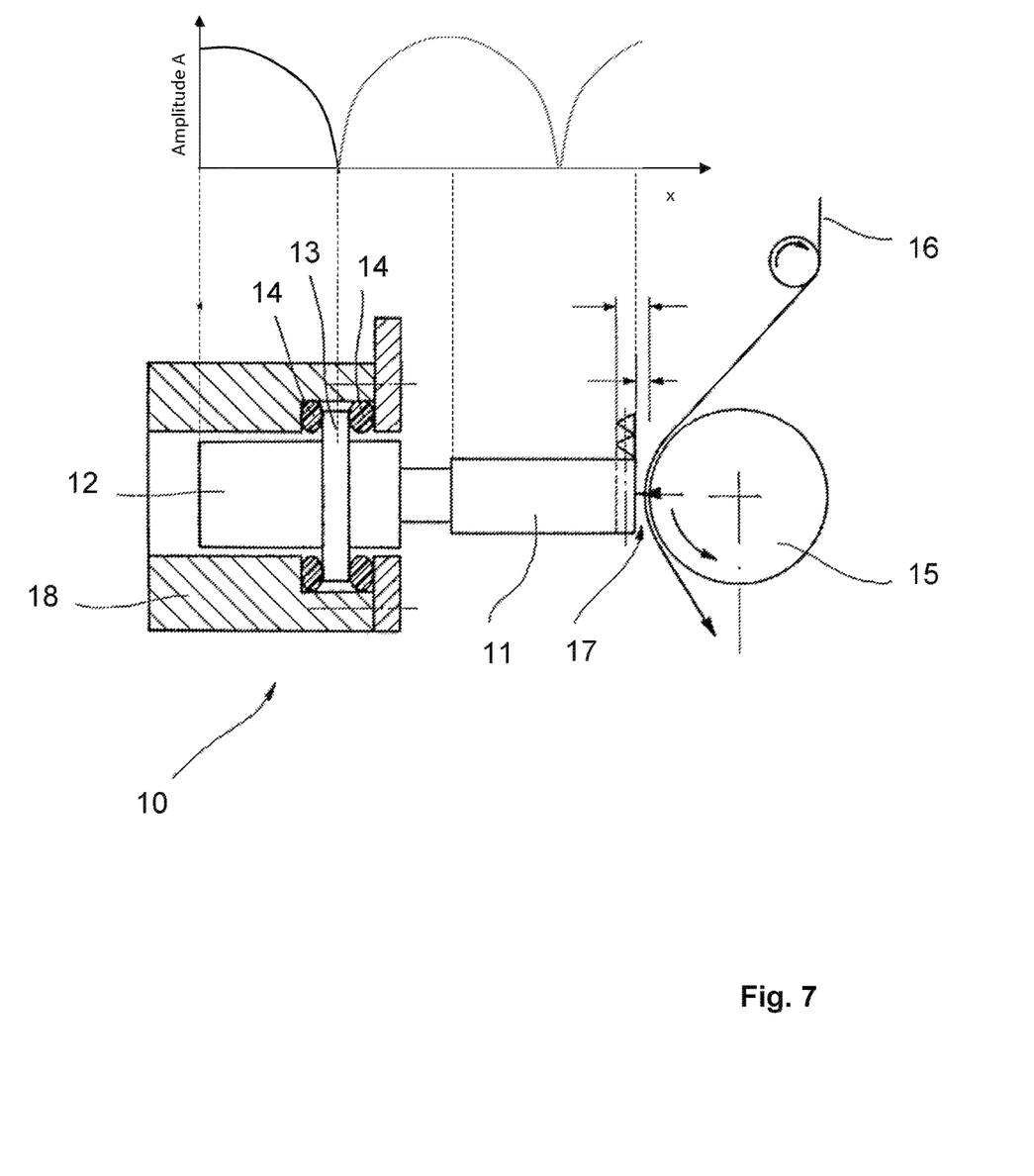
FIG. 7 shows a diagrammatic view of an ultrasonic vibration unit of the state of the art.

By way of example FIG. 7 shows a known configuration of an ultrasonic vibration unit 10. It comprises a converter housing 18, the converter 12 which has a piezoelectric vibration module, and a sonotrode 11 fixed to the converter 12. The converter has a flange 13 which is mounted softly in the converter housing 18 by way of elastic O-rings. Arranged in opposite relationship from the sonotrode 11 is a counterpart tool 15. Remaining between the sonotrode 11 and the counterpart tool 15 is a gap 17 through which a web of material which is to be worked by means of the ultrasonic vibration unit 10 is moved.

In order to produce ultrasonic vibrations of the greatest possible amplitude the sonotrode must be excited with an excitation frequency close to a resonance frequency of the sonotrode. Frequently the resonance frequencies of the sonotrode are also referred to as natural frequencies.

The converter is usually operated with a working frequency which is almost equal to the natural frequency f of the sonotrode. The converter itself is for the most part caused to vibrate by the application of an ac voltage to piezoelectric elements in the converter. The working frequency at which the converter vibrates is thus controlled by the applied frequency of an ac voltage. The individual components of the ultrasonic vibration unit are coordinated with each other in such a way that the entire vibration system has a natural frequency corresponding to the natural frequency of the sonotrode. Upon excitation of the ultrasonic vibration unit with that natural frequency a standing longitudinal wave is formed in the entire ultrasonic vibration unit with stationary vibration modes and antinodes, wherein the vibrations linked to the standing wave are at the working frequency.

In order to clearly show that illustrated above FIG. 7 is a graph which represents the magnitude of the vibration amplitude in dependence on position. It will be seen that the vibration amplitude presents a maximum both at the right-hand end of the ultrasonic vibration unit 10 which is in contact with the material webs 16 and also at the left-hand end of the ultrasonic vibration unit 10. The vibration amplitude is at a minimum in the region of the flange 13. A further vibration node is to be found in the sonotrode 11.

Arranging the flange 13 in the vibration node provides that the flange 13 vibrates only slightly in the direction of propagation of the ultrasonic vibration.

The soft mounting by means of the O-rings 14 means that the ultrasonic vibration unit 10 is decoupled from the converter housing 18, so that practically no vibration energy is transmitted from the ultrasonic vibration unit 10 to the converter housing 18.

When using an ultrasonic vibration unit in an ultrasonic welding device, when performing ultrasonic welding of thin materials like for example when welding salad bags interaction effects with the material to be welded and/or a welding anvil used for that purpose also give rise to the excitation of unwanted parasitic vibrations which produce additional longitudinal vibrations in the ultrasonic vibration unit. Experience has shown that those parasitic vibrations are usually at a frequency which is lower than the working frequency.

Particularly in ultrasonic welding those low-frequency parasitic vibrations can give rise to a reduced quality in the welding result. They can also cause excessive stressing of the components of the ultrasonic welding device, in particular the piezoelectric elements of the converter, and are responsible for an increased energy demand. Furthermore the parasitic vibrations cause increased noise generation which is unwanted.

Therefore the object of the present invention is to provide an ultrasonic vibration unit in which the parasitic vibrations which usually occur in operation with a working frequency are slight or do not occur, while at the same time the actual working vibration is not attenuated.

According to the invention that object is attained in that there is provided a damped vibration absorber unit which is connected at a vibration node to the ultrasonic vibration unit, wherein the vibration absorber unit is connected to a damping element which is of such a configuration that it damps a vibration of the vibration absorber unit.

The term vibration absorber unit is used to mean any unit which can be excited to vibrate. It is not necessary, even if this may be advantageous, that the vibration absorber unit has a resonance frequency matched to certain frequencies. By virtue of the vibration absorber unit being connected to damping elements the vibration absorber unit is also referred to as a damped vibration absorber unit.

The advantage of using that damped vibration absorber unit is that a desired longitudinal working vibration of the converter with the working frequency is not damped by the damping elements while the lower-frequency parasitic vibration is damped. That is made possible by virtue of the fact that the damping elements are at the vibration absorber unit connected to the ultrasonic vibration unit at a vibration node of the standing wave of the working vibration. As however practically no vibration components of the desired working vibration are transmitted to the vibration absorber unit at the vibration nodes of the standing wave of the desired working vibration the working vibration is also not influenced by the damping of the vibration absorber unit. The connection according to the invention by way of a coupling element which is arranged at a vibration node permits only vibration components in the region of the vibration node to be transmitted to the vibration absorber unit and damped there. These however are substantially the unwanted parasitic vibrations. Therefore the working vibration is scarcely influenced by the damped vibration absorber unit.

Basically the structure according to the invention can be compared to an electromagnetic blocking circuit. A blocking circuit prevents the transmission of signals of a distinguished frequency while signals of all other frequencies are transmitted almost without being influenced.

In the same manner the arrangement of the coupling element allows transmission and thus energy transmission of vibrations which do not have vibration nodes in the region of the coupling element. All vibrations which have a vibration node in the region of the coupling element are blocked, that is to say they are not transmitted by way of the coupling element to the vibration absorber unit.

The vibration absorber unit thus has imposed thereon an enforced vibration whose vibration frequency differs from the natural frequency f or the working frequency of the ultrasonic vibration unit. By virtue of the vibration of the vibration absorber unit vibration energy is transmitted from the vibration absorber unit to the damping element and for example transformed into heat energy.

The present invention thus makes use of the realization that standing waves within an ultrasonic vibration unit, in respect of different frequencies, have vibration nodes and vibration antinodes at different locations.

It will be appreciated that the described standing wave with vibration nodes and vibration antinodes is a physical ideal concept which is not attained in practice. Depending on the actual geometry of the ultrasonic vibration and in particular the sonotrode however in any case regions of minimum vibration amplitude and regions of maximum vibration amplitude are produced. The term vibration node in accordance with the present invention is therefore always used to denote a region of minimum vibration amplitude. Insofar as the coupling element is to be connected to the ultrasonic vibration unit at a vibration node this only means that the coupling element is to be disposed in a region of minimum vibration amplitude. It will further be appreciated that the coupling element has a finite extent in the direction of the standing wave and therefore cannot engage the ultrasonic vibration unit in point relationship.

In a preferred embodiment the damping element comprises a different material from the vibration absorber unit. In that case the damping elements preferably comprises an elastomer. It has been found that elastomers are particularly suitable for producing the desired damping of the vibration absorber unit. The use of an elastomer as the damping element is moreover both inexpensive and also simple. An elastomer can be connected to the vibration absorber unit for example by clamping or molding.

In a further preferred embodiment the damping element comprising an elastomer has a contact surface, by way of which it is in contact with the vibration absorber unit, wherein the contact surface is preferably >2 cm$^2$, particularly preferably >10 cm$^2$ and best >20 cm$^2$. A sufficiently large contact surface between the vibration absorber unit and an elastomer, as is described here, provides that the vibration energy can be efficiently transmitted from the vibration absorber unit to the elastomer and converted by same into heat energy.

In a particularly preferred embodiment the damping element comprising an elastomer is so arranged that it exerts a force on the vibration absorber unit by way of said contact surface, wherein preferably the damping element exerts a force in a direction towards the vibration absorber unit over the contact surface. The force transmission described here can for example be implemented by clamping rings which press an elastomer on to or against the vibration absorber unit. That results in advantageous coupling of the damping element to the vibration absorber unit, thereby providing efficient transmission of the vibration energy from the vibration absorber unit to the damping element.

In a further preferred embodiment the vibration absorber unit is of a mass which is <10%, preferably between 1% and 8% and best between 3% and 5% of the mass of the ultrasonic vibration unit.

In a further preferred embodiment the damping element is of such a configuration and arrangement that it damps the vibration absorber unit with a degree of damping of between 5% and 50% and preferably between 7.5% and 20%. The degree of damping is a dimension-less value representing a measure in respect of damping of the vibration absorber unit. The degree of damping is in part also referred to as the damping factor or Lehr's damping measure.

In a particularly preferred embodiment the coupling element is arranged at the converter of the ultrasonic vibration unit.

In this embodiment the ultrasonic vibration unit is of such a configuration that a vibration node of the working vibration is in the region of the converter. For example the ultrasonic vibration unit can provide two vibration nodes and three vibration antinodes, wherein a vibration node is in the region of the converter and a vibration node is in the region of the sonotrode.

The arrangement of the coupling element at a vibration node which is in the region of the converter has on the one hand the advantage that in that region the vibration amplitude of the desired ultrasonic vibration is less than in the region of the sonotrode so that energy transfer from the desired vibration on to the vibration absorber unit is still further reduced. On the other hand tests and simulation calculations have shown that the vibration amplitude of the parasitic vibration in the region of the converter is greater than in the region of the sonotrode so that the energy transfer of the parasitic vibration on to the vibration absorber unit is greater in the region of the converter.

The aim of coupling the damped vibration absorber unit by way of a coupling element is to transmit as much energy as possible from the parasitic vibration to the vibration absorber unit and at the same time to transmit as little vibration energy as possible from the desired working vibration to the vibration absorber unit.

In a further particularly preferred embodiment the converter has an outside surface in the form of a cylindrical surface and the coupling element is at least portion-wise in the form of a flange connected to the cylindrical outside surface of the converter. In that case the flange is preferably provided in one piece with the converter. Shaping the coupling element as a flange is a variant which is simple to produce and inexpensive. In particular a flange represents an ideal coupling element for coupling the converter to the cylindrical vibration absorber unit.

In an alternative preferred embodiment the coupling element is of such a configuration that it is of a Z-shaped cross-section. In other words the coupling element has three portions, namely a first radial portion which extends radially relative to the cylinder axis and which engages the converter, an axial portion extending in the axial direction in relation thereto and a second radial portion extending in a radial direction from the axial portion.

In a particularly preferred embodiment the vibration absorber unit is connected to the converter and forms a converter housing which encloses the converter at its end remote from the sonotrode. Preferably the converter housing has a housing bottom and a cylindrical housing wall, the cylindrical housing wall being connected to the coupling element. The use of the vibration absorber unit as the converter housing is particularly advantageous as in that way the vibration absorber unit at the same time performs two important functions. On the one hand it protects the converter and the electronics connected thereto from external influences and on the other hand it affords the option of efficiently damping a parasitic vibration which occurs in operation by virtue of the fitment of damping elements.

In a further preferred embodiment the damping element is in the form of a sleeve surrounding the converter housing. In that arrangement the damping element is elastically biased in such a way that it exerts a force on the converter housing. In this case an elastomer sleeve for example can be used as the damping element, wherein the diameter of the elastomer sleeve in the non-expanded state is less than the diameter of the cylindrical converter housing. When the elastomer sleeve is now fitted over the converter housing the elasticity of the elastomer causes a force of the elastomer to act on the converter housing. Simple feasibility is particularly advantageous with this embodiment.

In an alternative embodiment the damping element is arranged within the converter housing. In particular the damping element in this case is either connected to the converter housing over the entire contact surface or it is pressed against the converter housing by means of a clamping element. This embodiment has the advantage that the damping element itself is protected from the environment by the converter housing and thus environmental influences acting on the damping element are minimized.

In a further alternative embodiment a damping element comprising an elastomer is pressed against the inside wall of the converter housing by means of a clamping element, the clamping element being of a conical external contour. The damping element is of a sleeve-shaped configuration and has a conical internal contour of a configuration corresponding to the external contour of the clamping element. By virtue of a movement of the clamping element relative to the converter housing in the direction of the axis of the cone the damping element is clamped between the clamping element and the converter housing and thus the desired damping action is achieved.

For example a sleeve of elastomer and a metal sleeve having a conical external contour can be used as the clamping element. The installation of such a structure is found to be simple and can be effected as described hereinafter. Both sleeves are pushed into a cylindrically shaped converter housing, the cylinder bottom having to be opened for those purposes. Firstly the elastomer sleeve is pushed in and then the metal sleeve which, by virtue of the conical configuration of its external contour, presses the elastomer sleeve against the inside wall of the converter housing. In that arrangement the conical external contour of the metal sleeve is of such a configuration that stable pressing of the elastomer is achieved precisely when the metal sleeve has been pushed completely into the converter housing.

Further advantages, features and possible uses of the present invention will be apparent from the following description of preferred embodiments. In the drawings.

Figure 1:
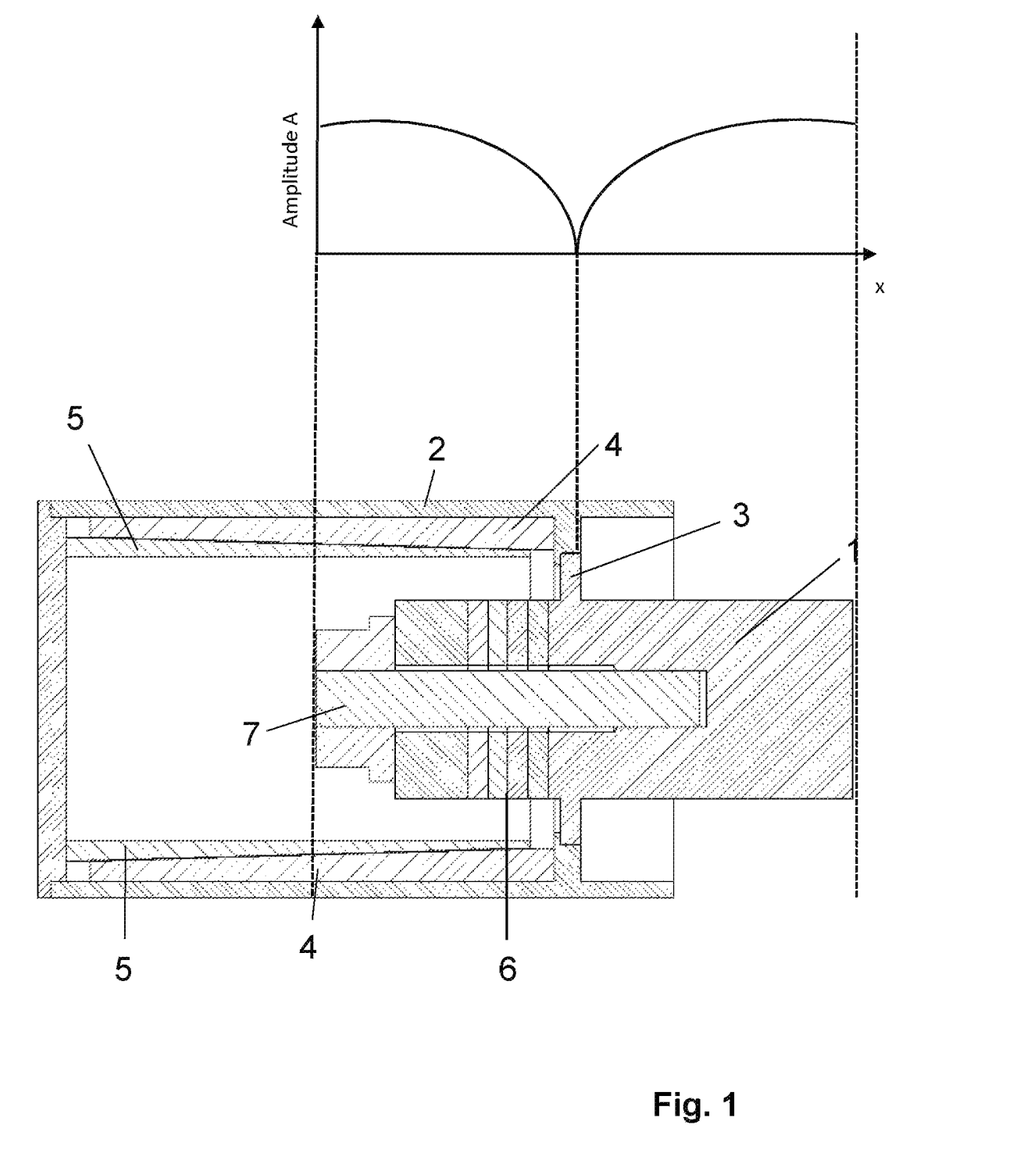
FIG. 1 shows a sectional view of a vibration absorber unit fixed to a converter of a first embodiment of the invention.

FIG. 1 shows a first embodiment of a vibration absorber unit fixed to a converter. The Figure shows a sectional view through the converter 1 connected to a vibration absorber unit 2 by way of a coupling element 3. In the present case all illustrated elements are of cylinder-symmetrical relationship with respect to the longitudinal axis of the converter 1 so that the present sectional view represents any section plane which contains the longitudinal axis of the converter and the converter housing/the vibration absorber unit.

Although not shown in the Figure the converter 1 is vibrationally coupled to a sonotrode. In this case vibration coupling can be effected either by the sonotrode adjoining the converter 1 at the right in FIG. 1 or by the converter 1 being connected at its right side to an amplitude transformer to which the sonotrode is in turn fixed.

FIG. 1 also shows further details of the converter 1 like the piezoelectric elements 6 and the converter screw 7. The coupling element 3 of the converter is in the form of a flange to which the vibration absorber unit 2 is mounted. The vibration absorber unit here is in the form of the converter housing 2 and in this view encloses the left-hand half of the converter 1. Fitted to the inside wall of the converter housing 2 is a sleeve-shaped damping element 4 which is pressed against the inside wall of the converter housing 2 by means of a conical clamping element 5. The vibration absorber unit 2 which is damped by the damping element 4 and the conical clamping element 5 is fixed to the converter as shown in FIG. 1 by way of a coupling element 3.

The ultrasonic vibration unit comprising the sonotrode and the converter 1 and optionally an amplitude transformer arranged between the converter 1 and the sonotrode is of such a configuration that, when it is excited with the ultrasound natural frequency f, a standing wave is produced in the longitudinal direction. The vibration amplitude of that longitudinal wave is locationally dependent, that is to say zones of a minimum vibration amplitude and zones of a maximum vibration amplitude are formed within the ultrasonic vibration unit. For illustration purposes, shown above the view of the converter is a graph showing the magnitude of the vibration amplitude A over the longitudinal axis x. It will be seen that, in the region in which the coupling element 3 engages the converter 1, the vibration amplitude A is at a minimum (vibration nodes) while the vibration amplitude increases in the direction of the end boundary surfaces of the converter. Vibration antinodes are therefore formed at the end faces.

According to the invention the position of the coupling element 3 is so selected that it coincides with the position of a vibration node. This ensures that no or almost no energy transfer is effected for the desired ultrasonic vibration by way of the coupling element to the vibration absorber unit. For the situation where the ultrasonic vibration unit has parasitic vibration components they generally do not involve any vibration nodes at the position of the coupling element 3 so that an energy transfer to the vibration absorber unit 2 occurs for parasitic vibration components.

As shown in FIG. 1 the coupling element 3 is in the form of a flange in one piece with the converter. In an alternative embodiment however it can also be in the form of a separate component.

Figure 2:
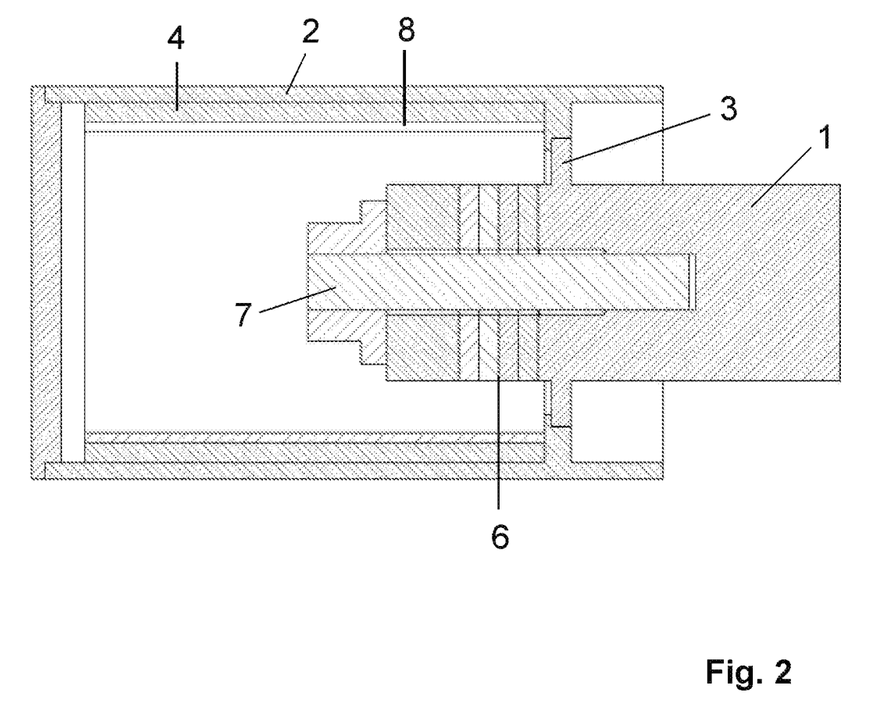
FIG. 2 shows a sectional view of a vibration absorber unit fixed to a converter of a second embodiment of the invention.

FIG. 2 shows a sectional view through a second embodiment of a vibration absorber unit fixed to a converter. The converter 1, the coupling element 3 (the flange) and the vibration absorber unit 2 are here of a design corresponding to the first embodiment. The illustrated section plane corresponds to the section plane shown in FIG. 1. The damping element 4 is here also an elastomer sleeve which however, unlike the first embodiment, is pressed in this embodiment against the inside wall of the converter housing 2 by means of a spreader ring 8. The spreader ring 8 exerts approximately the same force on the damping element 4 in all regions in which it is in contact with the damping element 4.

Figure 3:
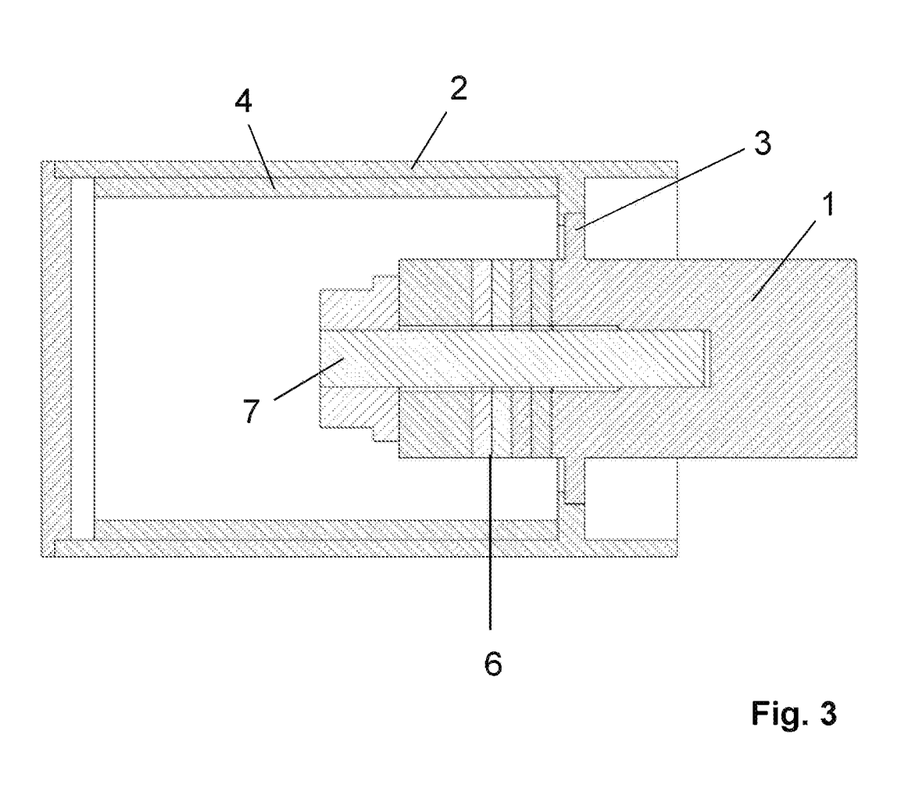
FIG. 3 shows a sectional view of a vibration absorber unit fixed to a converter of a third embodiment of the invention.

FIG. 3 shows the sectional view of a third embodiment of a vibration absorber unit fixed to a converter. This embodiment differs in relation to the second embodiment (FIG. 2) only insofar as the damping element 4 is not fixed by means of a spreader ring 8 but is fitted by casting to the inside wall of the converter housing. Accordingly this embodiment does not include any additional clamping element for fixing the damping element 4 to the vibration absorber unit 2.

Figure 4:
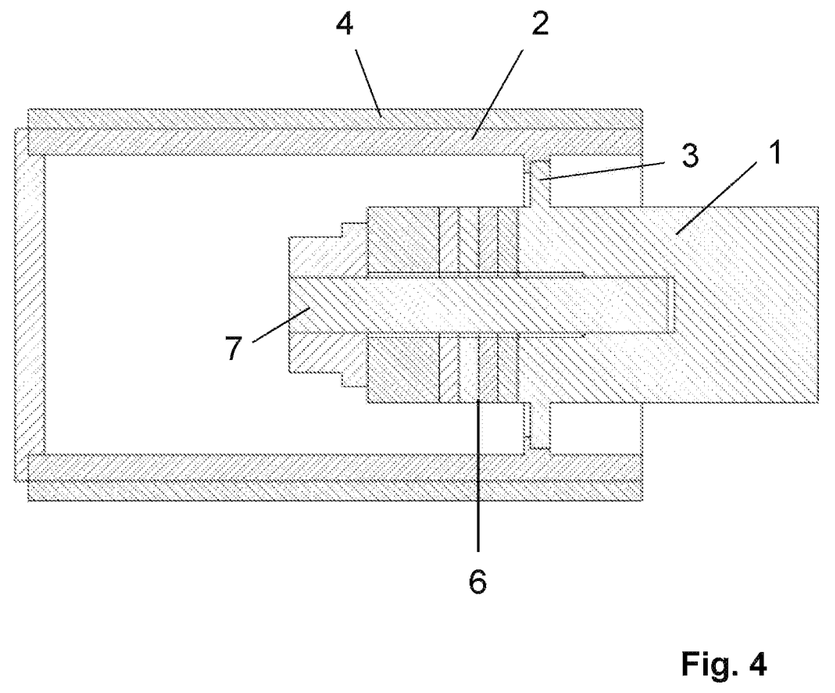
FIG. 4 shows a sectional view of a vibration absorber unit fixed to a converter of a fourth embodiment of the invention.

FIG. 4 shows a fourth embodiment of a vibration absorber unit fixed to a converter. This differs from the preceding illustrated embodiments of the invention insofar as the damping element 4 is mounted to the outside of the converter housing 2. In this case the damping element 4 can for example comprise an elastic elastomer sleeve which is of an undersize with respect to the cylindrical converter housing 2. When such an elastomer sleeve 4 is fitted as in the present case over the converter housing 2 then by virtue of its undersize and its elasticity it presses with a force dependent on the undersize and the elasticity against the outside wall of the converter housing 2.

Figure 5:
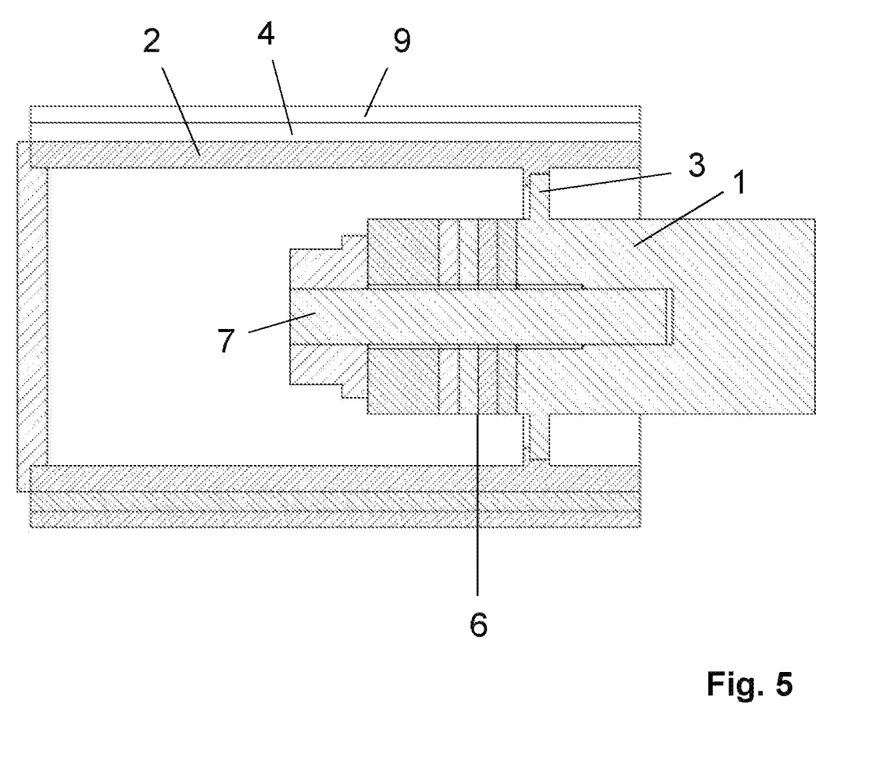
FIG. 5 shows a sectional view of a vibration absorber unit fixed to a converter of a fifth embodiment of the invention.

FIG. 5 shows a fifth embodiment of the invention which differs from the embodiment shown in FIG. 4 insofar as the damping element 4, in this case again provided by an elastomer sleeve, is here fitted to the outside wall of the converter housing 2 and is pressed against the converter housing 2 by means of clamping rings 8. Accordingly in this embodiment also, just as in the fourth embodiment, a damping element 4 is pressed with a force against the outside wall of the converter housing 2, in which case here the damping element 4 does not have to involve an undersize as the force is applied by the stressing effect produced by means of the clamping rings 8.

Figure 6:
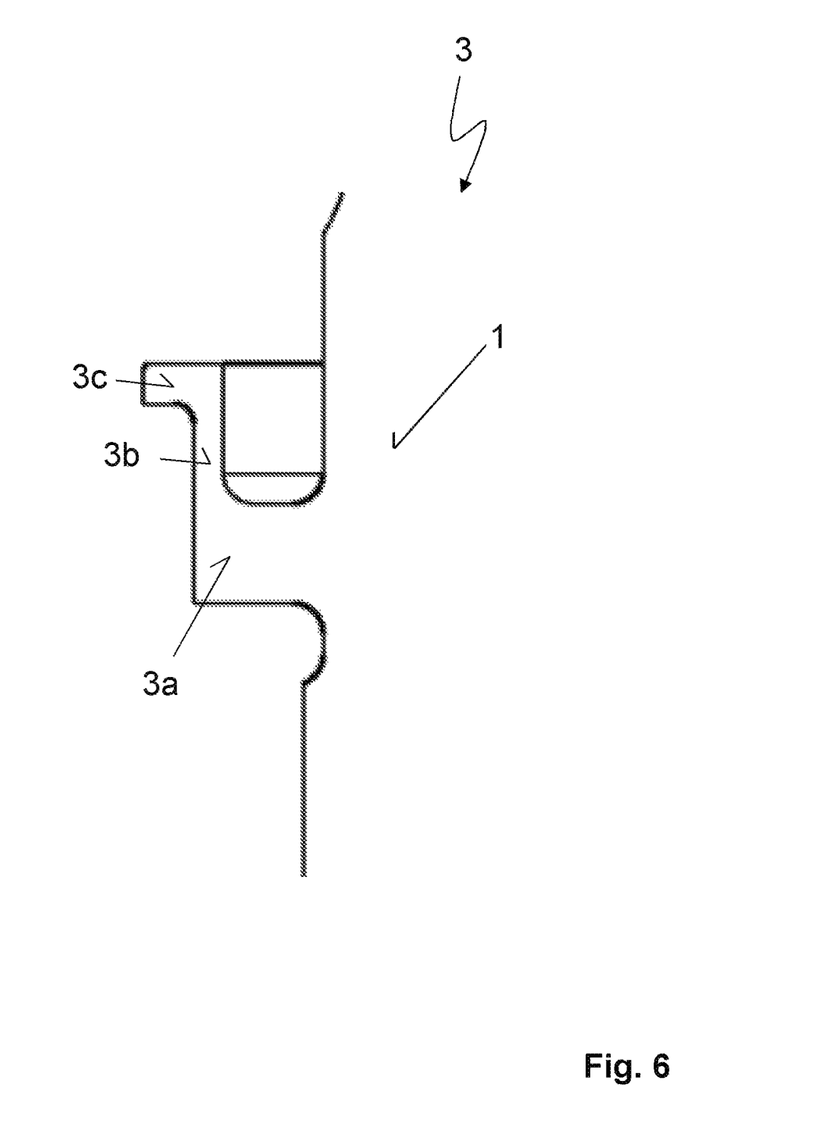
FIG. 6 shows a sectional view of an alternative embodiment of a coupling element.

FIG. 6 shows a partial sectional view of an alternative embodiment of a coupling element 3. The coupling element 3 is connected in one piece to the converter 1 and has a first radial portion 3a which extends substantially radially from the cylindrical external contour of the converter 1, an axial portion 3b which extends substantially perpendicularly relative to the first radial portion 3a and thus substantially axially and a second radial portion 3c which extends radially from the axial portion 3b. The second radial portion 3c can then be connected to the vibration absorber unit or to the converter housing which is in the form of a vibration absorber unit.

LIST OF REFERENCES 1 converter
2 vibration absorber unit/converter housing
3, 3a-c coupling element
4 damping element
5 conical clamping element
6 piezoelectric elements
7 converter screw
8 spreader ring
9 clamping ring
10 ultrasonic vibration unit
11 sonotrode
12 converter
13 flange
14 O-ring
15 counterpart tool
16 material web
17 gap
18 converter housing

The invention claimed is:

1. An ultrasonic vibration unit which has a converter (1) for converting an electric ac voltage into a mechanical ultrasonic vibration and a sonotrode which is vibrationally coupled to the converter (1),
wherein the sonotrode and the converter (1) are matched to each other in such a way that the ultrasonic vibration unit can vibrate with a natural frequency f, in which a standing longitudinal wave with at least one vibration node and at least two vibration antinodes is formed within the ultrasonic vibration unit,
characterised in that there is provided a damped vibration absorber unit (2) connected to the ultrasonic vibration unit by way of a coupling element (3), the damped vibration absorber unit (2) being attached only to the coupling element (3)
wherein the coupling element (3) is connected at a vibration node to the ultrasonic vibration unit,
wherein the vibration absorber unit (2) is connected to a damping element (4) which is so designed that it damps a vibration of the vibration absorber unit (2).

2. An ultrasonic vibration unit according to claim 1 characterised in that the damping element (4) comprises a different material from the vibration absorber unit (2).

3. An ultrasonic vibration unit according to claim 2 characterised in that the damping element (4) has a contact surface with which the damping element (4) is in contact with the vibration absorber unit (2).

4. An ultrasonic vibration unit according to claim 3 characterised in that the damping element (4) is so arranged that it exerts a force on the vibration absorber unit (2) by way of the contact surface, wherein preferably the damping element (4) exerts a force in a direction towards the vibration absorber unit (2) by way of the contact surface.

5. An ultrasonic vibration unit according to claim 1 characterised in that the mass of the vibration absorber unit (2) is less than 10% of the mass of the ultrasonic vibration unit.

6. An ultrasonic vibration unit according to claim 1 characterised in that the damping element (4) is of such a configuration and arrangement that it damps the vibration absorber unit (2) with a degree of damping between 5% and 50%.

7. An ultrasonic vibration unit which has a converter (1) for converting an electric ac voltage into a mechanical ultrasonic vibration and a sonotrode which is vibrationally coupled to the converter (1),
wherein the sonotrode and the converter (1) are matched to each other in such a way that the ultrasonic vibration unit can vibrate with a natural frequency f, in which a standing longitudinal wave with at least one vibration node and at least two vibration antinodes is formed within the ultrasonic vibration unit,
characterised in that there is provided a damped vibration absorber unit (2) connected to the ultrasonic vibration unit by way of a coupling element (3), wherein the coupling element (3) is connected at a vibration node to the ultrasonic vibration unit,
wherein the vibration absorber unit (2) is connected to a damping element (4) which is so designed that it damps a vibration of the vibration absorber unit (2) wherein the coupling element (3) is arranged at the converter (1).

8. An ultrasonic vibration unit according to claim 7 characterised in that the converter (1) has a cylinder-shaped outside surface, wherein the coupling element (3) is at least portion-wise in the form of a flange which is connected to the cylinder-shaped outside surface of the converter (1).

9. An ultrasonic vibration unit according to claim 7 wherein the vibration absorber unit (2) is in the form of the converter housing (2) which encloses the converter (1) at its end remote from the sonotrode.

10. An ultrasonic vibration unit according to claim 9 characterised in that the damping element (4) is in the form of a sleeve which surrounds the converter housing (2).

11. An ultrasonic vibration unit according to claim 9 characterised in that the damping element (4) is arranged within the converter housing (2) and either is connected thereto over the entire contact surface or is pressed against the vibration absorber unit (2) by means of a clamping element.

12. An ultrasonic vibration unit according to claim 11 characterised in that the clamping element has a conical external contour and a damping element comprising an elastomer has a corresponding conical internal contour.

13. An ultrasonic vibration unit according to claim 2 wherein the damping element comprises an elastomer.

14. An ultrasonic vibration unit according to claim 3 wherein the contact surface is greater than 2 cm².

15. An ultrasonic vibration unit according to claim 5 characterised in that the mass of the vibration absorber unit (2) is between one percent and eight percent of the mass of the ultrasonic vibration unit.

16. An ultrasonic vibration unit according to claim 8 wherein the flange is integrally connected to the converter (1).

17. An ultrasonic vibration unit according to claim 9 wherein the converter housing (2) has a housing bottom and a cylindrical housing wall, wherein the cylindrical housing wall is connected to the coupling element (3).

18. An ultrasonic vibration unit according to claim 10 wherein the damping element (4) is elastically biased in such a way that it exerts a force on the converter housing (2).

19. An ultrasonic vibration unit according to claim 14 wherein the contact surface is greater than 10 cm².

20. An ultrasonic vibration unit according to claim 15 characterised in that the mass of the vibration absorber unit (2) is between three percent and five percent of the mass of the ultrasonic vibration unit.

21. An ultrasonic vibration unit which has a converter (1) for converting an electric ac voltage into a mechanical ultrasonic vibration and a sonotrode which is vibrationally coupled to the converter (1),
wherein the sonotrode and the converter (1) are matched to each other in such a way that the ultrasonic vibration unit can vibrate with a natural frequency f, in which a standing longitudinal wave with at least one vibration node and at least two vibration antinodes is formed within the ultrasonic vibration unit,
characterised in that there is provided a damped vibration absorber unit (2) connected to the ultrasonic vibration unit by way of a coupling element (3),
wherein the coupling element (3) is connected at a vibration node to the ultrasonic vibration unit,
wherein the vibration absorber unit (2) is connected to a damping element (4) which is so designed that it damps a vibration of the vibration absorber unit (2),
wherein the damping element (4) has a contact surface with which the damping element (4) is in contact with the vibration absorber unit (2),
wherein the contact surface is greater than 2 cm².

22. An ultrasonic vibration unit which has a converter (1) for converting an electric ac voltage into a mechanical ultrasonic vibration and a sonotrode which is vibrationally coupled to the converter (1),
wherein the sonotrode and the converter (1) are matched to each other in such a way that the ultrasonic vibration unit can vibrate with a natural frequency f, in which a standing longitudinal wave with at least one vibration node and at least two vibration antinodes is formed within the ultrasonic vibration unit,
characterised in that there is provided a damped vibration absorber unit (2) connected to the ultrasonic vibration unit by way of a coupling element (3),
wherein the coupling element (3) is connected at a vibration node to the ultrasonic vibration unit, wherein the vibration absorber unit (2) is connected to a damping element (4) which is so designed that it damps a vibration of the vibration absorber unit (2),
wherein the mass of the vibration absorber unit (2) is between 1% and 10% of the mass of the ultrasonic vibration unit.

* * * * *

UNITED STATES PATENT AND TRADEMARK OFFICE
CERTIFICATE OF CORRECTION

PATENT NO. : 11,376,630 B2
APPLICATION NO. : 16/765228
DATED : July 5, 2022
INVENTOR(S) : Ertz et al.

Page 1 of 1

It is certified that error appears in the above-identified patent and that said Letters Patent is hereby corrected as shown below:

In the Claims

Column 8, Line 43, Claim 4, delete "preferably".

Signed and Sealed this
Thirtieth Day of August, 2022

Katherine Kelly Vidal
*Director of the United States Patent and Trademark Office*